United States Patent Office 2,837,579
Patented June 3, 1958

2,837,579

POLYCHLORINATED DICYCLOPENTADIENE

George Allen Buntin, Wilmington, Del., assignor to Hercules Powder Company, Wilmington, Del., a corporation of Delaware No Drawing. Application February 19, 1952
Serial No. 272,528

5 Claims. (Cl. 260—648)

This invention relates to new stable polychloro tetrahydrodicyclopentadienes and more particularly to polychloro tetrahydrodicyclopentadienes containing at least four chlorine atoms and to insecticidal compositions containing these polychloro tetrahydrodicyclopentadienes as the toxic ingredient.

It is well known that dicyclopentadiene will add bromine to form a bromide which is extremely unstable, losing hydrogen bromide and forming a black resinous product.

Now in accordance with this invention, it has been found that a polychloro tetrahydrodicyclopentadiene containing from four to ten chlorine atoms may be prepared which is stable even on prolonged standing at room temperature and that insecticidal compositions containing these polychloro tetrahydrodicyclopentadienes having from four to ten chlorine atoms possess an unusual degree of insecticidal activity.

The following examples will illustrate the preparation of these polychloro tetrahydrodicyclopentadienes and the insecticidal activity of compositions containing them.

Example I

One part of commercial dicyclopentadiene dissolved in 5 parts of carbon tetrachloride was placed in a chlorination vessel and exposed to ultraviolet illumination. Chlorine was passed into the agitated mixture at a rate that allowed for maximum absorption of the chlorine. The temperature rose immediately, due to the heat of the reaction, to 65° C. and gradually decreased as the chlorination proceeded and at the end of the chlorination (19 hours) the temperature had dropped to 43° C. After 8 hours of chlorination, samples were taken about every 2 hours, a total of 6 samples being removed. The carbon tetrachloride was removed from each of these samples by distillation under reduced pressure. A viscous yellow liquid remained in each case.

The 6 chlorinated dicyclopentadiene materials, of different chlorine content, were tested for their insecticidal activity against houseflies. In this and the following examples the test for insecticidal activity against houseflies was made in the following manner as is referred to in this specification as the Bell Jar Method.

Approximately 100 five-day old flies (*Musca domestica*) were placed in a bell jar and a predetermined quantity of the insecticide to be tested was atomized into the bell jar. The quantity of insecticide used was equal to the amount of the Official Test Insecticide which was necessary to give a 30 to 55% kill and must be within the limits of 0.4 to 0.6 ml. After spraying the insecticide into the chamber the flies were placed in an observation cage containing a wad of cotton wet with a dilute sugar solution. At the end of 24 hours the number of dead and moribund flies was counted. All tests were carried out at 80–90° F. and 50–70% relative humidity.

The results of the analysis for chlorine content and of tests made on 1% solutions in deodorized kerosene of the above 6 polychloro tetrahydrodicyclopentadienes are given in the following table. The data are an average of a series of tests made on each solution.

| Chlorination Time in Hrs. | Approximate Number of Chlorine Atoms | Percent Chlorine | Percent Dead in 24 Hrs. | O. T. I. Difference |
|---|---|---|---|---|
| 10 | 5 | 56.8 | 35 | −15 |
| 12 | 6 | 61.5 | 78 | +28 |
| 13.5 | 6.5 | 64.2 | 96 | +46 |
| 15 | 7 | 65.4 | 97 | +47 |
| 16 | 7.5 | 67.0 | 98 | +48 |
| 19 | 8 | 68.0 | 98 | +48 |

The last four of the above series of polychloro tetrahydrodicyclopentadienes were also tested at a concentration of 0.5% in deodorized kerosene. The results of these tests are:

| Percent Chlorine | Approximate Number of Chlorine Atoms | Percent Dead in 24 Hrs. | O. T. I. Difference |
|---|---|---|---|
| 64.2 | 6.5 | 60 | +8 |
| 65.4 | 7 | 74 | +22 |
| 67.0 | 7.5 | 76 | +24 |
| 68.0 | 8 | 83 | +31 |

Example II

Commercial dicyclopentadiene was chlorinated as described in Example I. After chlorinating for 20 hours, 3 samples were taken at 6- to 8-hour intervals. These samples were worked up and tested for their insecticidal activity as described in Example I, all insecticidal tests being made on a 1% solution of the polychloro tetrahydrodicyclopentadiene in deodorized kerosene.

| Chlorination Time in Hrs. | Approximate Number of Chlorine Atoms | Percent Chlorine | Percent Dead in 24 Hrs. | O. T. I. Difference |
|---|---|---|---|---|
| 20 | 8 | 68.1 | 93 | +37 |
| 26 | 9 | 71.3 | 88 | +32 |
| 34 | 10 | 72.85 | 83 | +27 |

Example III

A polychloro tetrahydrodicyclopentadiene containing 74.1% chlorine which corresponds to 10 chlorine atoms per molecule (theory=73.8% Cl) was prepared as described in Example I by chlorinating dicyclopentadiene for 40 hours. When tested for its insecticidal activity by the Bell Jar Method, a 1% solution in an 80% deodorized kerosene—20% acetone solvent gave a kill of 64% in 24 hours (an O. T. I. difference of +31).

Example IV

A polychloro tetrahydrodicyclopentadiene containing 67.0% chlorine was tested for its insecticidal activity against adult male German roaches. In carrying out this test 10 to 15 roaches were placed in cages and sprayed with a 1% solution of the toxicant in deodorized kerosene. A 90% kill in 24 hours was obtained.

Example V

An insecticidal composition containing 0.5% of a polychloro tetrahydrodicyclopentadiene having a chlorine content of 67.0% and 2% of isobornyl thiocyanoacetate in deodorized kerosene was tested for its insecticidal activity against houseflies by the Bell Jar Method. This composition gave a knockdown of 100% in 1 minute and a 24-hour kill of 98% (an O. T. I. difference of +44).

Example VI

Chlorodihydro-exo-dicyclopentadiene was prepared by heating 600 parts of dicyclopentadiene with 800 parts of concentrated hydrochloric acid at 60–70° C. with agitation for 6 hours. The organic layer was then washed with water and dilute sodium bicarbonate until it was neutral and then was distilled under reduced pressure to yield 520 parts of the chlorodihydro-exo-dicyclopentadiene boiling at 75–80° C. at 0.3 mm. pressure and containing 18.6% chlorine.

The above chlorodihydro-exo-dicyclopentadiene (444 parts) was dissolved in 2220 parts of carbon tetrachloride. Chlorine was passed into the agitated mixture which was exposed to ultra-violet light, the temperature rising to 69° C. due to the heat of reaction. After 7 hours of chlorination, samples were removed at periodic intervals. The carbon tetrachloride was removed from each of these fractions by distillation under reduced pressure and a yellow viscous liquid was obtained in each instance. These samples were tested for their insecticidal activity as described in Example I. The results of testing 5% solutions in deodorized kerosene of these fractions are given in the following table:

| Chlorination Time in Hrs. | Approximate Number of Chlorine Atoms | Percent Chlorine | Percent Dead in 24 Hrs. | O. T. I. Difference |
|---|---|---|---|---|
| 7 | 4 | 52.2 | 84 | +53 |
| 10 | 5.5 | 59.4 | 100 | +69 |
| 13 | 7 | 65.4 | 100 | +69 |
| 16 | 8 | 68.5 | 100 | +69 |
| 22 | 8.5 | 70.1 | 100 | +69 |

The last four of the above series of chlorinated chlorodihydro-exo-dicyclopentadiene were also tested at a concentration of 1% in deodorized kerosene with the following results:

| Percent Chlorine | Approximate Number of Chlorine Atoms | Percent Dead in 24 Hrs. | O. T. I. Difference |
|---|---|---|---|
| 59.4 | 5.5 | 50 | +8 |
| 65.4 | 7 | 86 | +44 |
| 68.5 | 8 | 89 | +47 |
| 70.1 | 8.5 | 75 | +33 |

Example VII

An insecticidal composition containing 0.5% of chlorinated chlorodihydro-exo-dicyclopentadiene (prepared as described in Example VI and containing 70.1% chlorine) and 2% isobornyl thiocyanoacetate in deodorized kerosene was tested for its insecticidal activity against houseflies by the Bell Jar Method. This composition had a knockdown of 100% in 1 minute and a 24-hour kill of 71% (an O. T. I. difference of +17).

The polychloro tetrahydrodicyclopentadienes in accordance with this invention should contain an amount of chlorine of about 52% to about 74% and preferably from about 60% to about 70%. This corresponds to about four to ten chlorine atoms per molecule or preferably about six to nine chlorine atoms. These new polychloro tetrahydrodicyclopentadienes containing from four to ten chlorine atoms per molecule are viscous yellow liquids which are stable compounds and do not decompose even on prolonged standing at room temperature.

The polychloro tetrahydrodicyclopentadiene may have either an exo or an endo configuration. For example, in the chlorination of dicyclopentadiene it is believed that the endo configuration is not disturbed and that the polychloro compound retains the endo form. However, when hydrogen chloride is added to dicyclopentadiene, a rearrangement is believed to occur and the product is believed to have an exo configuration. When this chlorodihydro-exo-dicyclopentadiene is chlorinated, it is believed that the polychloro compound obtained retains the exo form. As used in this application and the claims appended, the term dicyclopentadiene is meant to include both the endo and exo forms.

As already pointed out the polychloro tetrahydrodicyclopentadiene may be prepared by chlorinating dicyclopentadiene or hydrogen chloride addition products of dicyclopentadiene. The chlorination may be carried out in the presence or absence of a solvent. Lower temperatures are maintained during the chlorination, if a solvent is used; however, in some instances it is preferable to use high temperatures in order to obtain the desired degree of chlorination. Suitable solvents for the chlorination are chloroform, carbon tetrachloride, pentachloroethane, etc. A chlorination catalyst may be used if desired, ultra-violet light being particularly effective.

The new polychloro tetrahydrodicyclopentadienes having four to ten chlorine atoms per molecule are useful in insecticidal compositions. Compositions containing a polychloro tetrahydrodicyclopentadiene having a chlorine content of four to ten chlorine atoms or about 52% to 74% chlorine and preferably from about 60% to 70% chlorine, have a very high insecticidal activity. As may been seen from the foregoing examples, polychloro tetrahydrodicyclopentadienes having a chlorine content within the preferable range have a very high insecticidal activity even in solutions as dilute as 0.5%. Chlorinated dicyclopentadienes having a chlorine content of less than 52% are so inactive as to be worthless as insecticides. The same thing is true for polychloro tetrahydrodicyclopentadienes having a chlorine content above 74% as the insecticidal activity decreases greatly as the chlorine content is raised above this point. The polychloro tetrahydrodicyclopentadiene may be a single compound or a mixture of polychloro tetrahydrodicyclopentadienes having from four to ten chlorine atoms per molecule.

The insecticidal compositions of this invention may be made up of the polychloro tetrahydrodicyclopentadiene admixed with any suitable type of diluent. If a liquid spray is desired the polychloro tetrahydrodicyclopentadiene may be dissolved in any suitable solvent, such as kerosene or deodorized kerosene or it may be dispersed in water to form aqueous sprays. Insecticidal dusts may be prepared by placing the polychloro tetrahydrodicyclopentadiene on a diluent or carrier such as powdered carbon, kieselguhr, bentonite, pyrophyllite, etc.

For many purposes it may be desirable to use the polychloro tetrahydrodicyclopentadienes in combination with other insecticidal toxicants. Many toxicants have a very high knockdown in relatively dilute solutions, but higher concentrations must be used in order to obtain the desired degree of kill. Due to the very high degree of killing power which the polychloro tetrahydrodicyclopentadienes possess, these compounds may be added to such toxicants, thereby enabling the use of much more dilute solutions than would otherwise be possible. Toxicants with which these polychloro tetrahydrodicyclopentadienes may be combined include such compounds as rotenone, pyrethrum and the organic thiocyanates such as alkyl thiocyanates, thiocyano ethers such as β-butoxy-β'-thiocyanoethyl ether, and terpene thiocyanoacylates such as isobornyl thiocyanoacetate, fenchyl thiocyanoacetate and isobornyl α-thiocyanopropionate.

As may be seen from the foregoing examples, the polychloro tetrahydrodicyclopentadienes have extremely high insecticidal activity. Thus, the insecticidal compositions of this invention may contain any amount of the polychloro tetrahydrodicyclopentadiene that is effective against the pest being killed. For use as a household fly spray, these compounds are effective in as dilute a solution as 0.5% in deodorized kerosene, although for a general household insecticide 1% to 2% solutions might be desired. However, for killing many types of pests it will be desirable to use much higher concentrations of these toxicants.

This application is a continuation-in-part of my copending application, Serial No. 676,590, filed June 13, 1946, now abandoned.

What I claim and desire to protect by Letters Patent is:

1. As a new composition of matter, the stable insecticidally-active reaction product resulting from the direct chlorination of dicyclopentadiene until about 4 to about 8 chlorine atoms, corresponding to about 52 to about 68% chlorine, are introduced therein.

2. An insecticidal composition comprising the product obtained by chlorination of dicyclopentadiene with chlorine gas at an elevated temperature, below that at which the product decomposes, to a chlorine content of from 52% to 68% chlorine and an insecticidal adjuvant as a carrier therefor.

3. The method which comprises passing chlorine into a solution of dicyclopentadiene in a chlorination solvent until the chlorine content of the product is between 52% and 68%.

4. As a new composition of matter, the stable, insecticidally-active reaction product resulting from the direct chlorination of dicyclopentadiene until four chlorine atoms are introduced therein.

5. The method which comprises passing chlorine into a solution of dicyclopentadiene in a chlorination solvent until the chlorine content of the product is between 57½% and 66%.

References Cited in the file of this patent

UNITED STATES PATENTS

| | | |
|---|---|---|
| 2,382,038 | Bruson | Aug. 14, 1945 |
| 2,519,190 | Hyman | Aug. 15, 1950 |

OTHER REFERENCES

Kraemer et al.: "Ber. der deut. chem. Gesell.," col. 29, pp. 552–61 (1896).